US008440064B2

(12) United States Patent
Lee et al.

(10) Patent No.: US 8,440,064 B2
(45) Date of Patent: May 14, 2013

(54) ELECTRODE MODULE AND DEIONIZATION APPARATUS USING THE SAME

(75) Inventors: Won Kyoung Lee, Suwon-si (KR); Dae Wook Park, Hwaseong-si (KR); Hideo Nojima, Seongnam-si (KR); Phil Soo Chang, Seongnam-si (KR); Hyung Soo Noh, Suwon-si (KR); Sang Taek Lee, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1039 days.

(21) Appl. No.: 12/153,818

(22) Filed: May 23, 2008

(65) Prior Publication Data
US 2009/0223825 A1  Sep. 10, 2009

(30) Foreign Application Priority Data

Mar. 7, 2008 (KR) .................. 10-2008-0021468

(51) Int. Cl.
| C25C 7/02 | (2006.01) |
| B03C 5/02 | (2006.01) |
| C25B 11/02 | (2006.01) |
| C02F 1/469 | (2006.01) |

(52) U.S. Cl.
USPC ...... 204/660; 204/672; 204/674; 204/290.01; 204/290.03

(58) Field of Classification Search .......... 204/284, 204/290.01, 290.03, 672, 671, 674, 660
See application file for complete search history.

(56) References Cited

U.S. PATENT DOCUMENTS

| 3,658,674 | A | | 4/1972 | Benak |
| 5,954,937 | A | * | 9/1999 | Farmer ........................ 204/284 |
| 5,980,718 | A | | 11/1999 | Van Konynenburg et al. |
| 6,309,532 | B1 | | 10/2001 | Tran et al. |
| 6,589,405 | B2 | * | 7/2003 | Weres et al. ............. 204/290.01 |
| 6,761,809 | B2 | * | 7/2004 | Tran et al. .................... 204/284 |
| 6,830,595 | B2 | | 12/2004 | Reynolds, III |
| 2004/0129578 | A1 | * | 7/2004 | McLachlan et al. ..... 204/290.01 |
| 2008/0067061 | A1 | * | 3/2008 | Zuber et al. ............. 204/290.03 |

FOREIGN PATENT DOCUMENTS

| EP | 1 403 949 | 3/2004 |
| EP | 1 688 395 | 8/2006 |
| FR | 2 775 007 | 8/1999 |
| GB | 1 463 240 | 2/1977 |
| JP | 10-235362 | 9/1998 |
| JP | 2004-251445 | 9/2004 |
| JP | 2005-285691 | 10/2005 |

(Continued)

OTHER PUBLICATIONS

J. Liu, I. Watanabe, K. Yoshida, M. Atsuta. "Joint strength of laser-welded titanium." Dental Materials. Mar. 2002. vol. 18, Issue 2. pp. 143-148.*

(Continued)

*Primary Examiner* — Keith Hendricks
*Assistant Examiner* — Steven A. Friday
(74) *Attorney, Agent, or Firm* — Staas & Halsey LLP (57) ABSTRACT

An electrode module capable of improving productivity by integrally bonding a current collector and a pair of electrodes using a protective film. The current collector receives power from an external power supply, and the pair of electrodes receives power from the current collector. The current collector and electrodes are integrally bonded by thermocompression using a protective film.

11 Claims, 9 Drawing Sheets

FOREIGN PATENT DOCUMENTS

| KR | 10-1999-0043892 | 6/1999 |
|---|---|---|
| KR | 10-2001-0042427 | 5/2001 |
| KR | 10-2004-0031958 | 4/2004 |
| KR | 10-2004-0054352 | 6/2004 |
| KR | 10-2004-0078284 | 9/2004 |
| KR | 10-2004-0083573 | 10/2004 |
| KR | 10-2005-0022577 | 3/2005 |
| KR | 10-2005-0084613 | 8/2005 |
| KR | 10-2006-0024436 | 3/2006 |
| KR | 10-2006-0105034 | 10/2006 |
| KR | 10-2007-0071703 | 7/2007 |
| WO | 92/22096 | 12/1992 |
| WO | 01/90444 | 11/2001 |
| WO | WO 2005006480 A2 * | 1/2005 |

OTHER PUBLICATIONS

J. Palmer. "Brazing and welding 304L stainless steel." Dec. 1994. BrewingTechniques. vol. 2, Issue 6.*
European Search Report dated Jul. 1, 2009 in European Patent Application No. 08157483.2.
English Abstract of Korea Publication No. 10-2004-0083573, Published Oct. 6, 2004.
Patent Abstracts of Japan, Publication No. 2004-251445, Published Sep. 9, 2004.
English Abstract of Korea Publication No. 10-1999-0043892, Published Jun. 15, 1999.
English Abstract of Korea Publication No. 10-2004-0078284, Published Sep. 10, 2004.
English Abstract of Korea Publication No. 10-2001-0042427, Published May 25, 2001.
English Abstract of Korea Publication No. 10-2004-0054352, Published Jun. 25, 2004.
English Abstract of Korea Publication No. 10-2005-0084613, Published Aug. 26, 2005.
English Abstract of Korea Publication No. 10-2006-0024436, Published Mar. 16, 2006.
English Abstract of Korea Publication No. 10-2006-0105034, Published Oct. 9, 2006.
English Abstract of Korea Publication No. 10-2007-0071703, Published Jul. 4, 2007.
Office Action (Restriction Requirement) mailed Mar. 16, 2011 in co-pending U.S. Appl. No. 12/266,662.
Office Action mailed Jun. 22, 2011 in co-pending U.S. Appl. No. 12/266,662.
Office Action mailed Nov. 21, 2011 in co-pending U.S. Appl. No. 12/266,662.
U.S. Appl. No. 12/266,662, filed Nov. 7, 2008, Hyong Soo Noh, Samsung Electronics Co., Ltd.
U.S. Appl. No. 12/457,846, filed Jun. 23, 2009, Hyong Soo Noh, Samsung Electronics Co., Ltd.
English Abstract of Japanese Publication No. 2005-285691, Published Oct. 13, 2005.
English Abstract of Korean Publication No. 10-2004-0031958, Published Apr. 14, 2004.
English Abstract of Korean Publication No. 10-2005-0022577, Published Mar. 8, 2005.
Korean Patent Office Action issued in Korean Patent Application No. 10-2008-0021468 dated Oct. 30, 2012, (translation obtained).

* cited by examiner

ELECTRODE MODULE AND DEIONIZATION APPARATUS USING THE SAME

CROSS-REFERENCE TO RELATED APPLICATIONS

This application claims the priority benefit of Korean Patent Application No. 2008-21468, filed on Mar. 7, 2008 in the Korean Intellectual Property Office, the disclosure of which is incorporated herein by reference.

BACKGROUND

1. Field

The present invention relates to a deionization apparatus, and more particularly to a capacitive deionization apparatus that removes ion components inside a fluid (liquid or gas) using an electrochemical method.

2. Description of the Related Art

Water, especially groundwater, contains a great amount of minerals such as calcium and magnesium. A total amount of such calcium or magnesium that has been expressed numerically is referred to as hardness in water. In this regard, hard water has high numbers and soft water has relatively small numbers.

When using hard water, i.e. water with high hardness, for a washing machine or a dish washer, the water reacts with a detergent causing a problem of degrading detergence. When using hard water for a steam generation unit or a heating unit, the water forms scales causing problems of reducing energy efficiency and nozzle clogging.

That is, hard water in home appliances, which use water, degrades detergence and accumulates a great amount of scales in the channel where water flows. Thus, the reliability of the product can be deteriorated.

In order to solve these problems, a water softener using an ion exchange resin has been suggested.

The water softener using an ion exchange resin softens water by exchanging hard water components Ca2+ and Mg2+ contained in water with NaCl and Na+ injected in the ion exchange resin. This water softener using an ion exchange resin is inconvenient, because NaCl must be injected to the ion exchange resin periodically, and the ion exchange resin itself must be replaced due to impurities contained in water. Moreover, the method of using ion exchange resin has disadvantages for being uneconomical, because acidic or basic solutions must be used in recycling the resin and a great amount of polymer resins and chemicals must be used to treat a great amount of water.

Recently, active researches on capacitive deionization (hereinafter, abbreviated as 'CDI') apparatus to overcome the above-mentioned disadvantages have been conducted.

Figure 1:
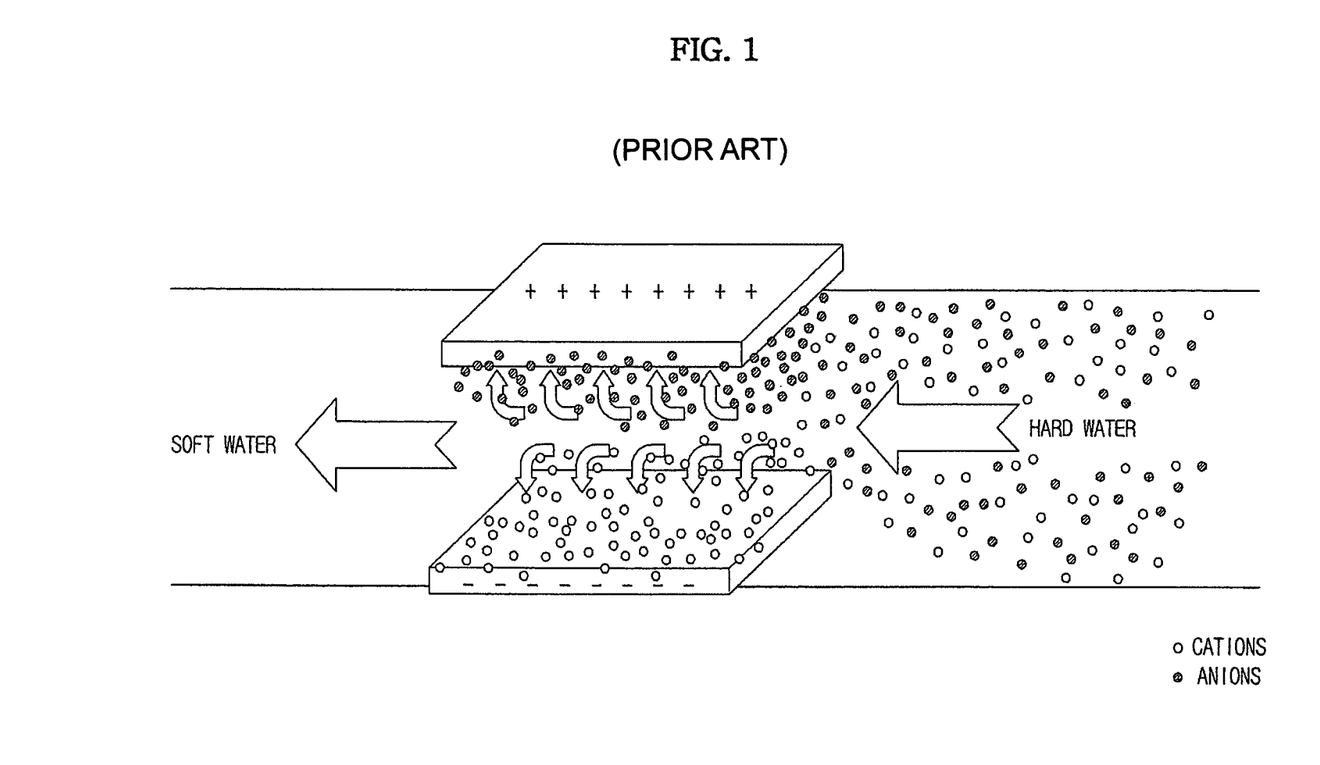
FIG. 1 is a view illustrating principles of a capacitive deionization (CDI) technology.

As shown in FIG. 1, a CDI technology is based on a simple principle that removes ions dissolved in a fluid such as water by applying a voltage between two porous electrodes such that anions are adsorbed to a positive electrode and cations are adsorbed to a negative electrode. In the CDI technology, the electrodes are easily recycled, because the ions adsorbed to the electrodes can be separated (desorbed) by oppositely changing the polarity of the electrodes or terminating the power supply when the ion adsorption to the electrodes is saturated. The CDI technology does not use detergent solutions such as acid or base to recycle the electrode as in the methods using an ion exchange resin or reverse osmosis. Thus, there are advantages in that no secondary chemical wastes are generated and the lifespan of the electrodes is semi-permanent due to a little corrosion and contamination.

Figure 2A:
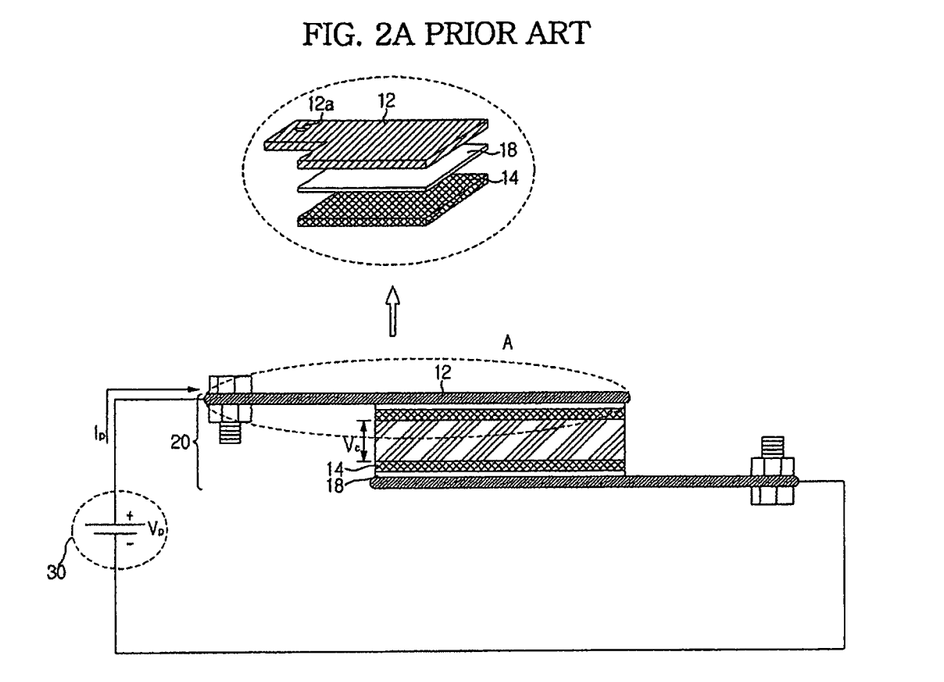
FIGS. 2A and 2B are views illustrating a unit cell structure and a power connection in a conventional CDI apparatus.
Figure 2B:
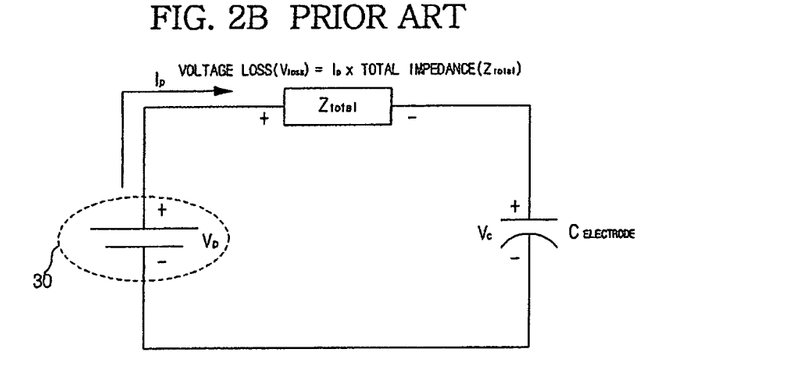

FIGS. 2A and 2B are views illustrating a unit cell structure and a power connection of a conventional CDI apparatus.

As shown in FIG. 2A, upper part of a unit cell 20 (A region in FIG. 2A) of a conventional CDI apparatus is connected to an anode of a power supply 30 and consists of a current collector 12 to apply power to electrodes 14 and a positive electrode 14. Lower part of the unit cell 20 consists of a current collector 12 to connect with a cathode of the power supply 30 and a negative electrode 14. Further, the current collector 12 and electrodes 14 are adhered to each other using a conductive binder (conductive double-sided tape 18) between the current collector 12 and the electrodes 14. The water softening process is carried out by having a fluid (liquid or gas) pass between the upper and lower part of the unit cell 20 and adsorbing ion components inside the fluid to the electrodes 14.

The unit cell 20 of the conventional CDI apparatus is connected to the power supply 30 by fastening a bolt to a bolt fastener hole 12a formed on the current collector 12.

Ideally, when connecting the unit cell 20 to the power supply 30, a supply voltage (Vp) of the power supply 30 should all be applied between the positive electrode 14 and the negative electrode 14 (Vp=Vc). However, in practical, a contact impedance caused by the bolt fastening and a parasitic impedance result in a voltage loss (Vloss) as shown in FIG. 2B.

That is to say, only a voltage which excluded the voltage loss (Vloss) from the supply voltage (Vp) of the power supply 30 is applied between the positive electrode 14 and negative electrode 14. At this time, the voltage loss (Vloss) is calculated by the following equations 1 and 2.

Voltage Loss (Vloss)=Current flowing in circuit of unit cell (Ip)×Total impedance inside unit cell (Ztotal)   [Equation 1]

Total impedance inside unit cell (Ztotal)=Contact impedance caused by bolt fastening (Zbolt)+Parasitic impedance caused by current collector (Zcurrent collector)+Parasitic impedance caused by conductive binder (Zbinder)+Parasitic impedance caused by electrodes (Zelectrodes)   [Equation 2]

Particularly, among the total impedance inside the unit cell 20 (Ztotal), the factor which gives biggest influence on the voltage loss is the contact impedance caused by the bolt fastening. The contact impedance is greatly influenced by a shape of the bolt and nut fastened to the bolt fastener hole 12a of the current collector 12 and a degree of tightening of the bolt and nut. That is, when the conventional CDI apparatus is used for a prolonged time, the degree of tightening becomes loosened, and as a result, the contact impedance is increased.

Figure 3:
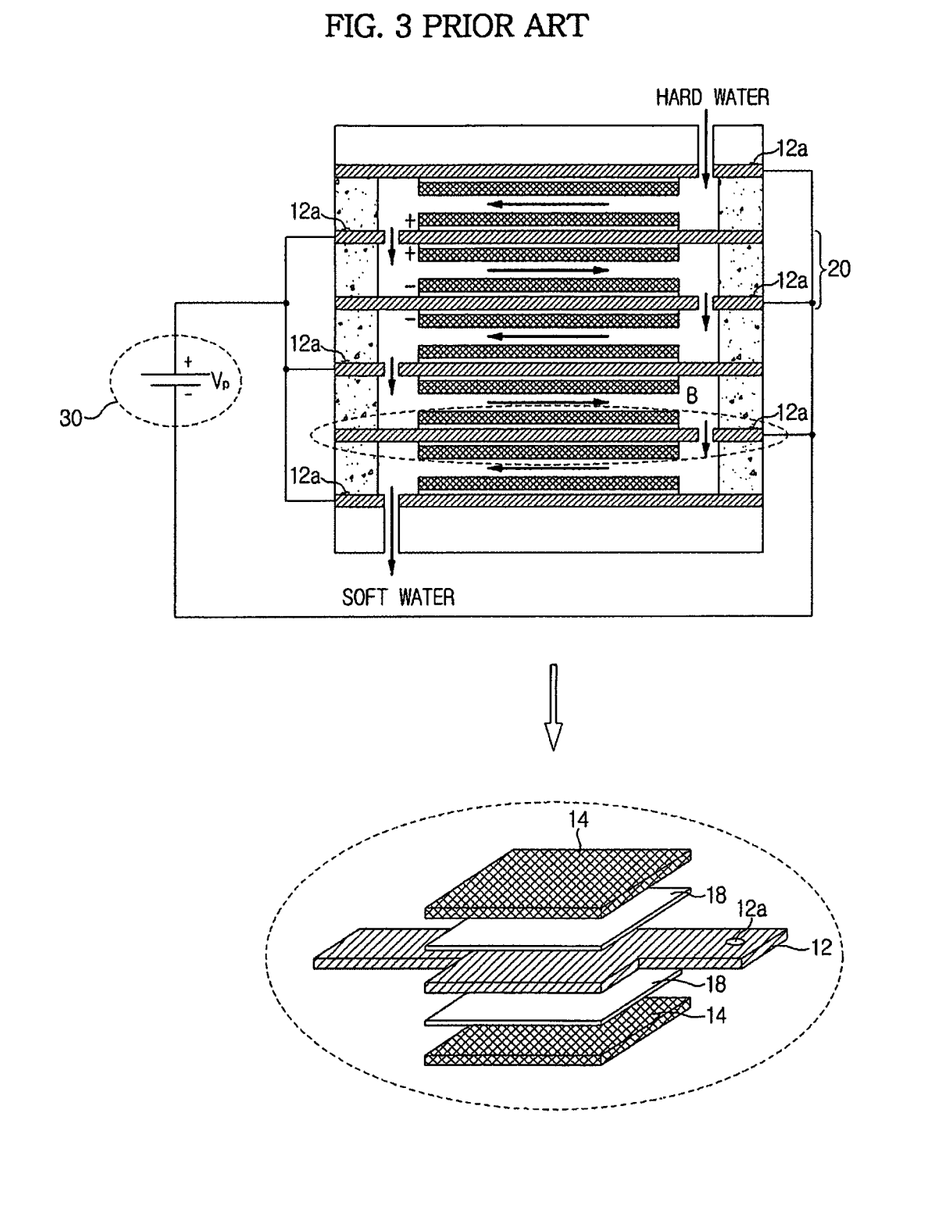
FIG. 3 is a view illustrating a stack structure of a conventional CDI apparatus.

FIG. 3 is a view showing a stack structure of a conventional CDI apparatus. A base unit structure that forms the stack structure of the conventional CDI apparatus is shown in B region of FIG. 3. The base unit structure consists of a current collector 12 to apply power to electrodes 14, and a pair of electrodes 14 each arranged above or below the current collector 12. The unit structure may further use a conductive binder (conductive double-sided tape 18) between the current collector 12 and the electrodes 14 to adhere the current collector 12 and the electrodes 14 together (however, the conductive binder is not necessarily used, because the impedance of the conductive binder tend to reduce electrical efficiency of a system).

The conventional CDI apparatus described with reference to FIGS. 2 and 3 has the following problems.

First, the base unit structure that constitute the stack structure of the CDI apparatus, that is, the current collector and electrodes are not integrally bonded. Thus, there is a problem that products with defects are manufactured during the assembly of the stack structure. Especially, graphite, which is commonly used for the current collector 12, has a nature to be easily broken, that usually results in production defects during the process to form the stack structure.

Secondly, the contact impedance generated by the bolt fastening between the current collector 12 and the power supply 30 causes insufficient voltage applied between the positive electrode 14 and the negative electrode 14. Thus, there is a problem that deionization efficiency is reduced, and as a result, the efficiency of a system is deteriorated.

Thirdly, the stack structure of the conventional CDI apparatus has many power connection terminals (bolt fastening holes) to apply power to each unit cell 20. Thus, there is a problem that the power application is difficult.

SUMMARY

Therefore, it is an aspect of the invention to provide an electrode module capable of improving productivity by integrally bonding a current collector and electrodes using a protective film.

It is another aspect of the invention to provide an electrode module capable of simplifying a stack structure and reducing contact impedance by integrally bonding a power connector to a current collector using a protective film.

It is another aspect of the invention to provide a plurality of electrode modules serially integrated using a protective film, in which the current collectors inside each electrode module are connected together to form a single current collector, and a deionization apparatus having the plurality of electrode modules serially formed into a stack structure using the flexibility of the integrally bonded electrode modules so that power connection to each electrode module is not necessary.

In accordance with an aspect of the invention, there is provided an electrode module including a current collector to receive power from an external power supply and a pair of electrodes to receive power from the current collector, wherein the current collector and electrodes are integrally bonded by thermocompression using a protective film.

The electrode module may further include a conductive binder between the current collector and electrodes for adherence.

The electrode module may further include a conductive binder formed between the current collector and each of the electrodes so that the current collector adheres to each electrode.

The protective film may be prepared to have a predetermined size larger than the size of the current collector and electrodes.

The protective film may have a hole to expose the electrodes.

The protective film may be made of polyimide.

In accordance with another aspect of the invention, there is provided an electrode module including a current collector to receive power from an external power supply; a pair of electrodes to receive power from the current collector; and a power connector to supply power to the current collector, wherein the current collector, electrodes and power connector are integrally bonded by thermocompression using a protective film.

The power connector may be made of a material capable of soldering.

The protective film may have a hole to expose the electrodes and power connector.

The electrode module may further include a conductive binder formed between the current collector and each of the electrodes so that the current collector adheres to each electrode.

In accordance with another aspect of the invention, there is provided a plurality of electrode modules each electrode module including a current collector to receive power from an external power supply and a pair of electrodes to receive power from the current collector, wherein the current collectors of the plurality of electrode module are connected together to form a single current collector, and the plurality of electrode modules are serially integrated by a thermocompression bonding using a protective film.

The current collector may have a connection part made of copper to connect to neighboring current collectors to form the single current electrode.

Each electrode module may further include a conductive binder between the current collector and electrodes for adherence, and the current collector may be made of copper.

Each electrode module may further include a conductive binder formed between the current collector and the pair of electrodes in each electrode module, so that the current collector adheres to the pair of electrodes in each electrode module.

The single current collector may be made of copper.

The current collectors connected together to form a single current collector may have a power connector at one end to connect the single current collector to a power supply. The power connector may be integrally bonded to the current collector by thermocompression using the protective film.

In accordance with another aspect of the invention, there is provided a deionization apparatus including a pair of end plates, a plurality of electrode modules formed between the end plates to perform deionization, and a spacer formed between the electrode modules to be spaced a predetermined distance apart from one another, wherein the current collectors inside the plurality of electrode modules are connected together to form a single current collector, and the plurality of electrode modules are serially integrated by a thermocompression bonding using a protective film.

A conductive binder may be formed between the current collector and the pair of electrodes in each electrode module, so that the current collector adheres to the pair of electrodes in each electrode module.

The current collectors connected together to form a single current collector may have a power connector at one end to connect the single current collector to a power supply. The power connector may be integrally bonded to the current collector by thermocompression using the protective film.

The spacer may be alternately laminated with the integrally bonded two electrode modules such that the two electrode modules may be spaced a predetermined distance apart from each other.

Any one of the two electrode modules may be connected with anode of a power supply at one end, and the other electrode module may be connected with cathode of the power supply at one end.

According to the present invention, the electrode module in which the current collector and electrodes are integrally bonded by thermocompression using the protective film is provided. This results in reducing the production defect rate during the assembly of a stack structure.

Moreover, the power connector is integrally bonded to the current collector using a protective film, thereby simplifying the stack structure and reducing contact impedance. This results in improving electrical efficiency of a system.

Furthermore, a plurality of electrode modules are serially integrated using a protective film, in which the current collectors inside the plurality of electrode modules are connected together to form a single current collector, and the integrally bonded electrode modules are serially formed into a stack structure using the flexibility of the integrally bonded electrode modules so that power connection to each electrode module is not necessary. This results in easy power application.

BRIEF DESCRIPTION OF THE DRAWINGS

These and/or other aspects, features, and advantages of exemplary embodiments of the invention will become apparent and more readily appreciated from the following description of exemplary embodiments, taken in conjunction with the accompanying drawings, of which.

DETAILED DESCRIPTION OF EMBODIMENTS

Reference will now be made in detail to exemplary embodiments of the present invention, examples of which are illustrated in the accompanying drawings, wherein like reference numerals refer to like elements throughout. Exemplary embodiments are described below to explain the present invention by referring to the figures.

Figure 4A:
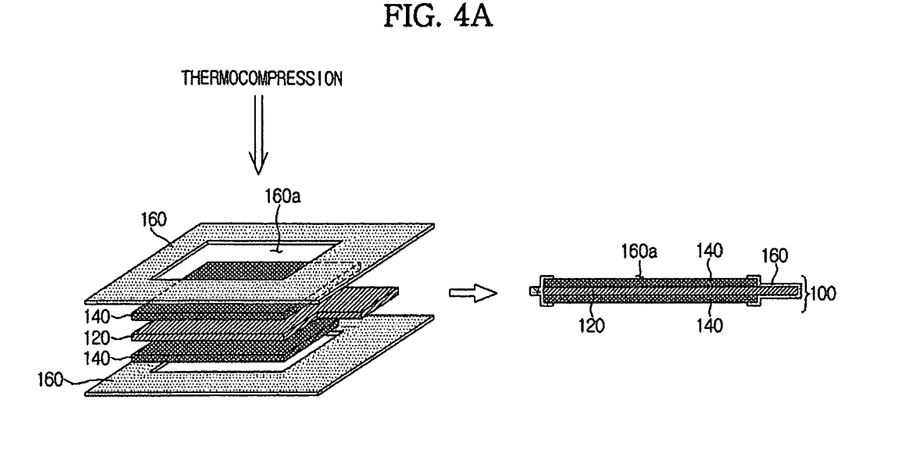
FIGS. 4A and 4B are views each illustrating a first exemplary embodiment of the present invention and a cross-section of an electrode module according to a modification of the first exemplary embodiment.

As shown in FIG. 4A, an electrode module 100 according to a first exemplary embodiment of the present invention includes a current collector 120 to receive power from an external power supply, a pair of electrodes 140 arranged above and below the current collector 120, the electrodes 140 receiving power from the current collector 120 to adsorb and desorb ions dissolved in a fluid, and a protective film 160 adhered on the current collector 120 and electrodes 140 to integrally bond the current collector 120 and electrodes 140. At this time, the current collector 120 and electrodes 140 are laminated in the order illustrated on the left-side of FIG. 4A. Thereafter, the current collector 120 and electrodes 140 are integrally bonded by thermocompression using the protective film 160. This integrally bonded electrode module 100 becomes a base unit structure that constitutes a stack structure of a deionization apparatus.

Here, the protective film 160 is prepared to have a predetermined size larger than a size of the current collector 120 and electrodes 140. The protective film 160 has a hole 160a to expose the electrodes 140. When forming the stack structure using the electrode module 100, the electrodes 140 are contacted with a fluid through the hole 160a formed on the protective film 160.

The current collector 120 may be made of carbon foil or graphite, which is not corrosive and which can reduce a production cost.

The electrodes 140 may be made of a conductive material, such as carbon aerogels, carbon nanotubes, graphite nanofibers, activated carbon electrodes, charcoals, or metal oxides, which is porous and have excellent adsorption property.

The protective film 160 is made of insulation material, and commonly of polyimide film.

Figure 4B:
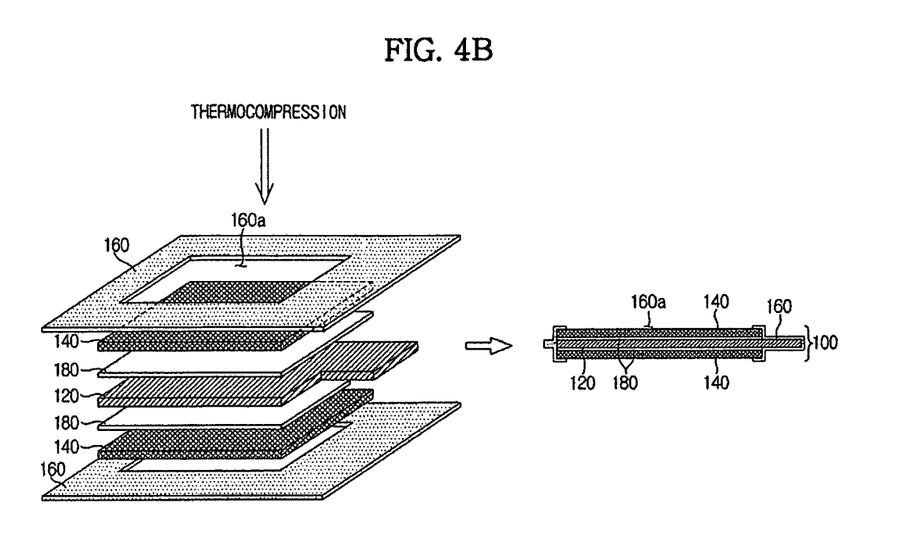

An electrode module illustrated in FIG. 4B is a modified exemplary embodiment of the electrode module according to the first exemplary embodiment of the present invention. In addition to the constituent components of the electrode module 100 according to the first exemplary embodiment of the present invention illustrated in FIG. 4A, the electrode module 100 further includes a conductive binder 180 formed between the current collector 120 and electrodes 140 to prevent metal corrosion and adhere the current collector 120 and electrodes 140 together. At this time, as the conductive binder 180, use can be made of a conductive paste, conductive tape, or the like.

Unlike the electrode module illustrated in FIG. 4A, the electrode module 100 illustrated in FIG. 4B has the conductive binder 180 interposed between the current collector 120 and electrodes 140, thereby preventing corrosion of the current collector 120 by water. Thus, as the current collector 120, use can be made of electrically conductive metals such as titanium and flexible metals such as copper in addition to rustless conductors such as carbon foil or graphite foil.

As described above by referring to FIGS. 4A and 4B, by integrally bonding the current collector 120 and electrodes 140 by thermocompression using the protective film 160, a production defect rate during the assembly of a stack structure can be reduced.

Figure 5A:
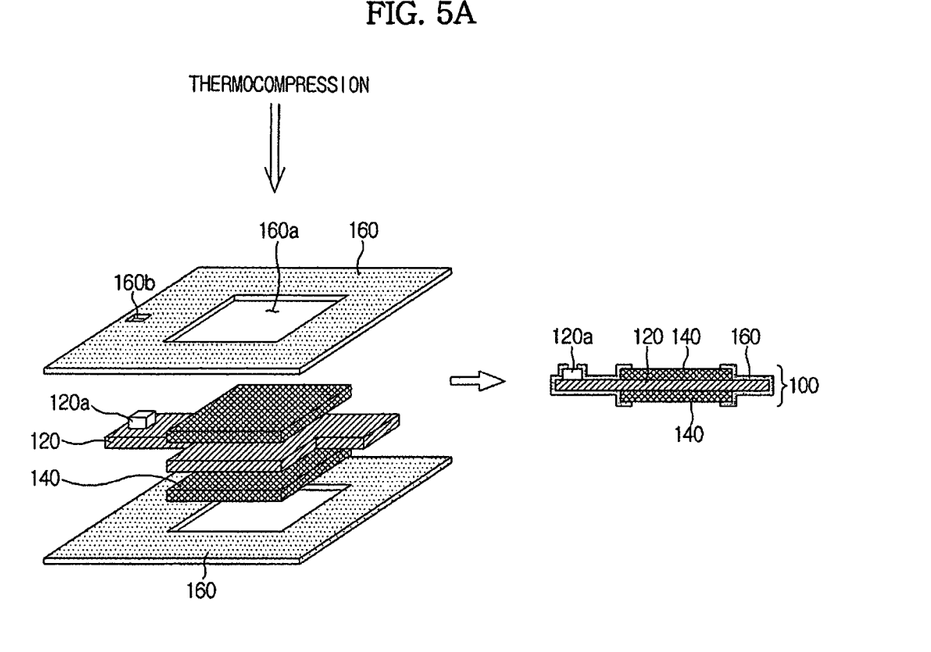
FIG. 5A is a sectional view of an electrode module according to a second exemplary embodiment of the present invention.
Figure 5B:
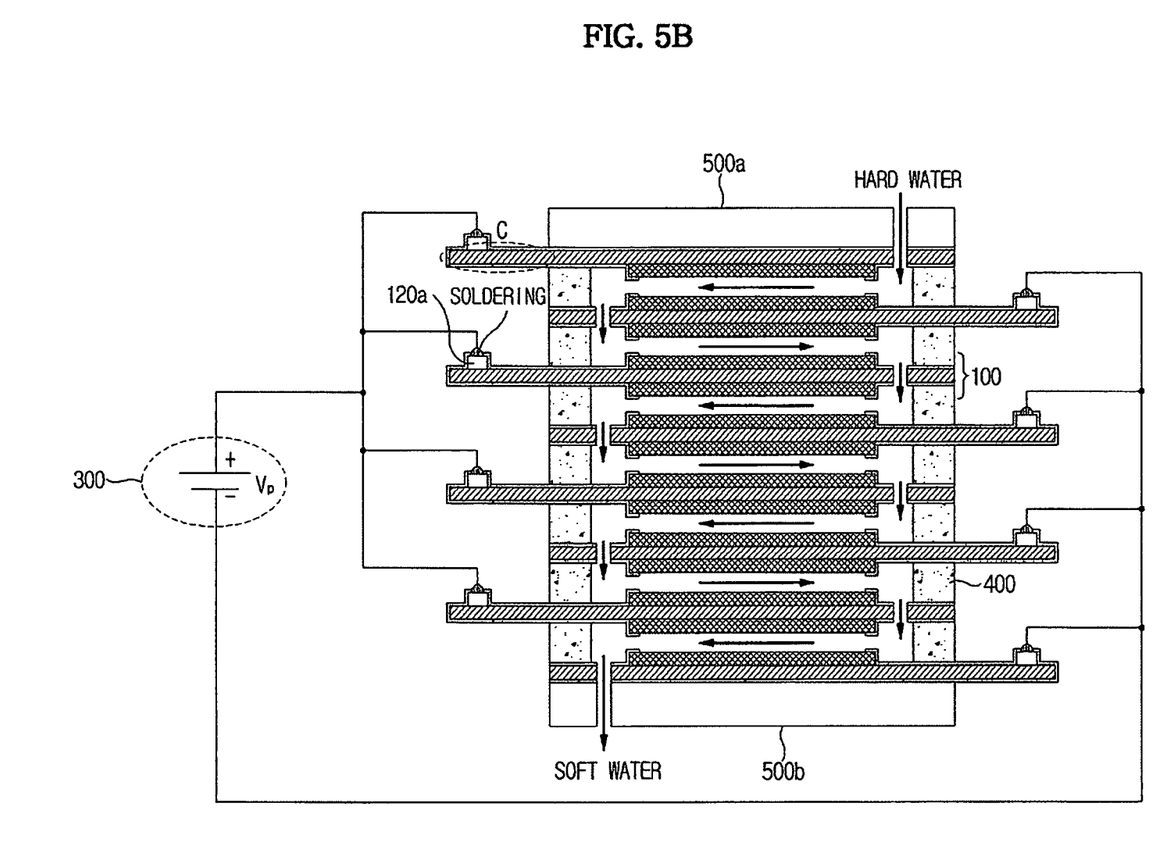
FIG. 5B is a view illustrating a stack structure of a deionization apparatus using the electrode module of FIG. 5A.

FIG. 5A is a sectional view of an electrode module according to a second exemplary embodiment of the present invention, and FIG. 5B is a view illustrating a stack structure of a deionization apparatus using the electrode module of FIG. 5A.

As shown in FIG. 5A, the electrode module 100 according to the second exemplary embodiment of the present invention includes a current collector 120 to receive power from an external power supply, a power connector 120a arranged at one end of the current collector 120 to connect with the power supply, a pair of electrodes 140 arranged above and below the current collector 120, the electrodes 140 receiving power from the current collector to adsorb and desorb ions dissolved in a fluid, and a protective film 160 adhered on the current collector 120 and electrodes 140 to integrally bond the current collector 120, power connecter 120a and electrodes 140. At this time, the current collector 120, power connecter 120a and electrodes 140 are laminated in the order illustrated on the left-side of FIG. 5A. Thereafter, the current collector 120, power connecter 120a and electrodes 140 are integrally bonded by thermocompression using the protective film 160. This integrally bonded electrode module 100 becomes a base unit structure that constitutes a stack structure of a deionization apparatus.

Here, the power connector 120a is made of a material capable of soldering (for example, copper).

The protective film 160 has holes 160a and 160b to expose the electrodes 140 and power connector 120a. At this time, the hole 160a formed to expose the electrodes 140 exists to allow the electrodes 140 to contact with a fluid when forming the stack structure using the electrode module 100 according to the present exemplary embodiment. The hole 160b formed to expose the power connector 120a exists to allow soldering between the connection supply 300 (FIG. 5B) and the power connector 120a.

The constituent components of the electrode module according to the second exemplary embodiment of the present invention are the same as the constituent components of the electrode module according to the first exemplary embodiment of the present invention, except for the power connector 120a. Thus, detailed description of the components will be omitted.

As shown in FIG. 5B, a deionization apparatus using the electrode module according to the second exemplary embodiment of the present invention includes a pair of end plates 500a and 500b that forms the exterior, a plurality of electrode modules 100, each having the current collector 120, a pair of electrodes 140 and power connector 120a integrally bonded by thermocompression using the protective film 160, a power supply 300 to apply a voltage to the electrode modules, and a spacer 400 to form a channel where a fluid inside the end plates 500a and 500b flows.

Here, the spacer 400 is interposed between the electrode modules 100 when laminating the plurality of electrode modules 100. The spacer 400 forms a channel capable of flowing a fluid by having each electrode module 100 spaced a predetermined distance apart from one another. The plurality of electrode modules 100 function to adsorb and desorb ions dissolved in the fluid which flows in the channel arranged between the pair of end plates 500a and 500b by the spacer 400.

At this time, the power supply 300 is connected to each power connector 120a prepared on each current collector 120 inside the laminated plurality of electrode modules 100 using a soldering method. Therefore, according to the present exemplary embodiment, the power supply 300 is connected to the electrode modules 100 through the soldering method instead of the bolt fastening method. Thus, the stack structure is simplified, and the contact impedances caused by the bolt fastening is reduced, thereby improving the electrical efficiency of a system.

Here, the top most and the bottom most electrode modules 100 that contact the end plates 500a and 500b have the electrode 140 arranged only at any one of above and below the current collectors 120. Thereafter, the electrode module is integrally bonded by thermocompression using the protective film 160.

When the region (C region of FIG. 5B) of the electrode module which is extruded externally to connect with the power supply 300 is made of a material, such as copper, capable of soldering, the connection to the power supply 300 is possible without the additional power connector 120a by directly soldering onto the current collector 120.

Figure 6A:
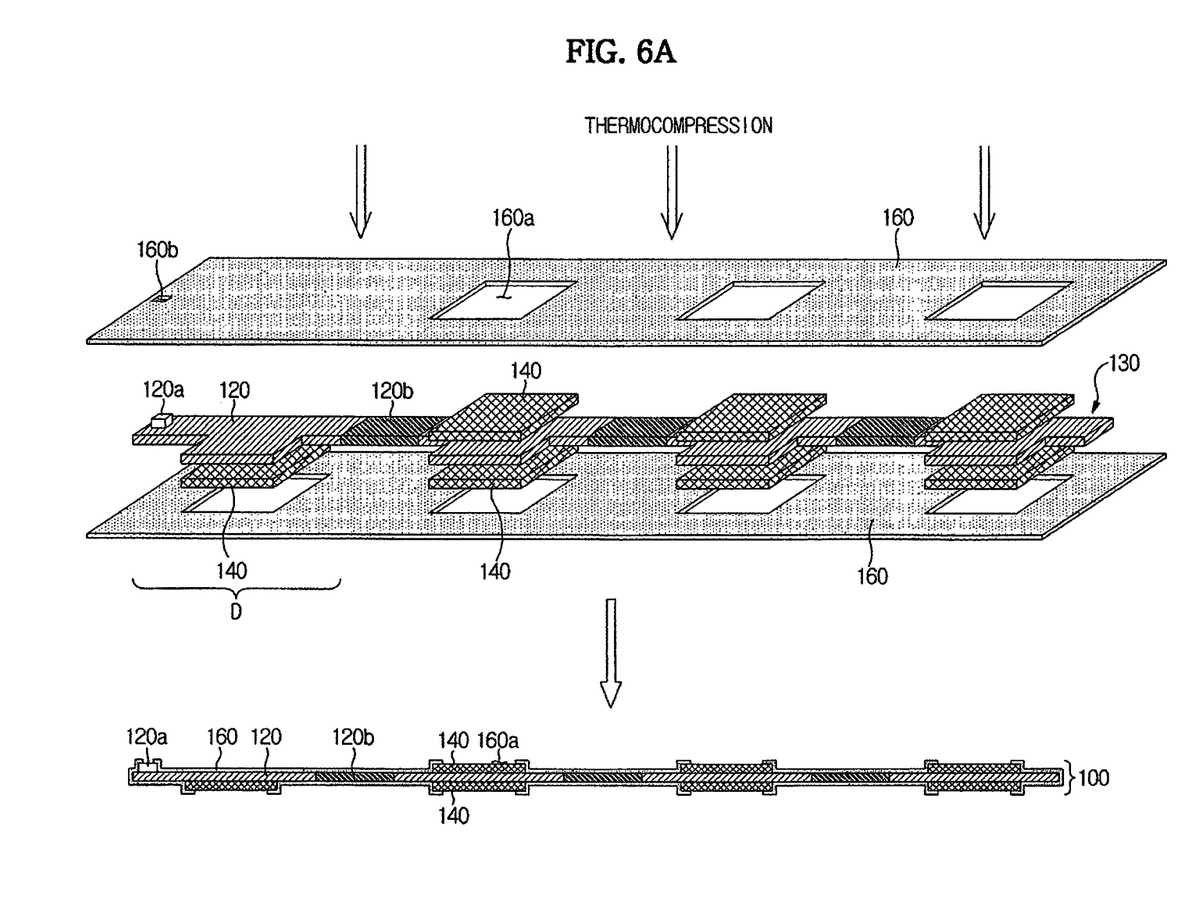
FIG. 6A is a sectional view of an electrode module according to a third exemplary embodiment of the present invention.
Figure 6B:
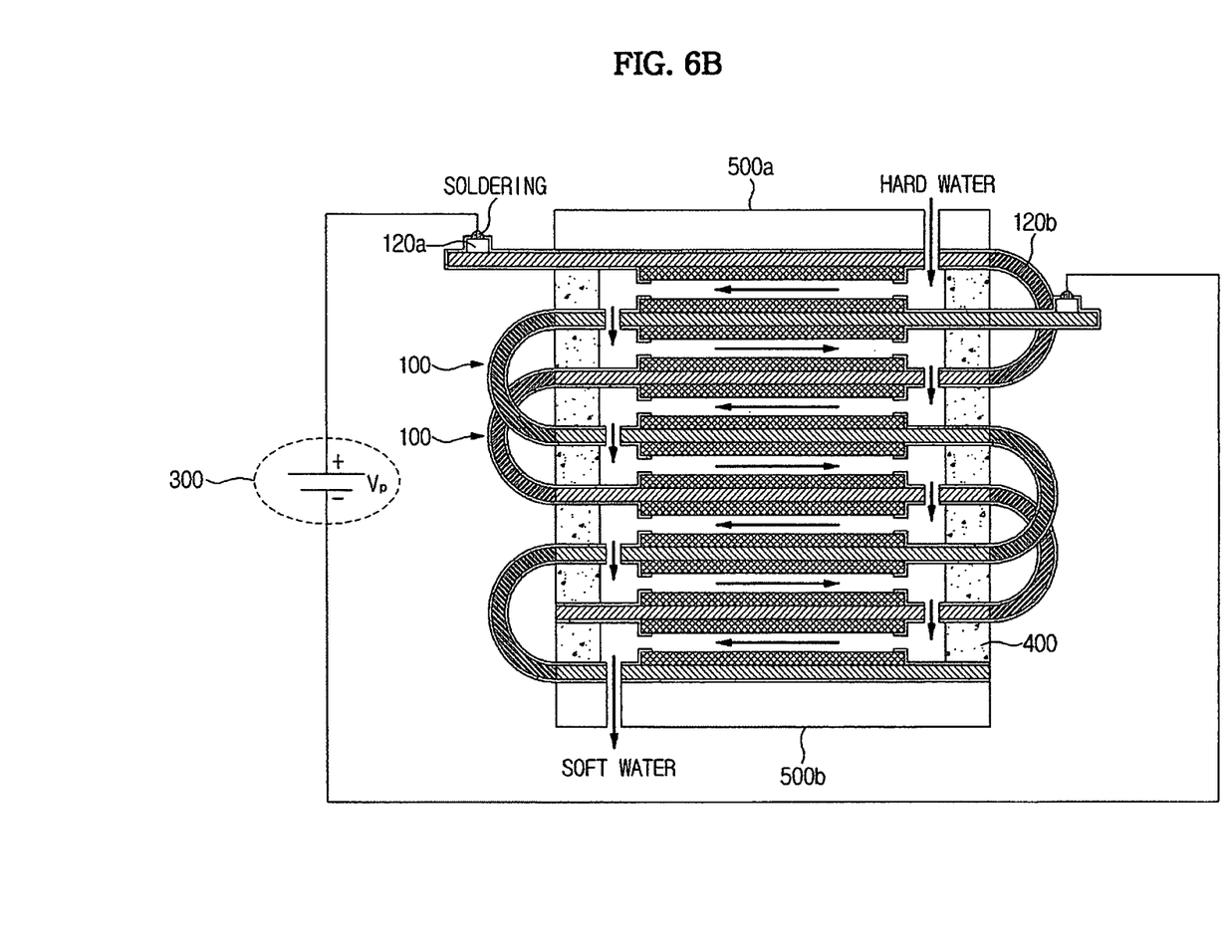
FIG. 6B is a view illustrating a stack structure of a deionization apparatus using the electrode module of FIG. 6A.

FIG. 6A is a sectional view of an electrode module according to a third exemplary embodiment of the present invention, and FIG. 6B is a view illustrating a stack structure of a deionization apparatus using the electrode module of FIG. 6A.

As shown in FIG. 6A, the electrode module according to the third exemplary embodiment of the present invention includes a single current collector 130 formed by interconnecting a plurality of current collectors 120 via connection parts 120b, a plurality of a pair of electrodes 140 each pair arranged above and below each current collector 120, and a protective film 160 used to serially integrate the current collectors 120 and electrodes 140 by the thermocompression bonding. At this time, the connection part 120b of the current collector 120 is made of a flexible conductor (for example, copper). Moreover, the uniformly connected current collector 130 has the power connector 120a at one end to connect with the power supply. The power connector 120a is integrally bonded with the current collector 130 and electrodes 140 by thermocompression using the protective film 160.

However, in the case of using a conductive binder between the current collector 120 and electrodes 140 to prevent corrosion of a metal and adhere the current collector 120 and electrodes 140 when forming the electrode module according to the present exemplary embodiment, there is no concern for rusting. Thus, the uniformly connected current collector 130 can be made of a flexible material such as copper without the additional connection parts 120b.

As shown in FIG. 6B, a deionization apparatus using the electrode module according to the third exemplary embodiment of the present invention includes a pair of end plates 500a and 500b that forms the exterior, two electrode modules 100, each having the single current collector 130 formed by interconnecting the plurality of current collectors 120 via connection parts 120b, plurality of a pair of electrodes 140 each pair arranged above and below each current collector 120 and power connector 120a integrally bonded by thermocompression using the protective film 160, a power supply 300 to apply a voltage to the electrode modules, and a spacer 400 to form a channel where a fluid inside the end plates 500a and 500b flows.

As described above, the connection part 120b of the current collector 120 inside the electrode module 100 according to the third exemplary embodiment of the present invention is made of a flexible material such as copper. Thus, the two electrode modules 100, each being integrally bonded as shown in FIG. 6B, are separately bent to have an S shape. Thereafter, the two electrode modules 100 are alternately laminated interposing the spacer 400 between the electrode modules 100 such that the spacer 400 forms a channel capable of flowing a fluid by having the two electrode modules spaced a predetermined distance apart from each other.

Here, any one of the two electrode modules are connected to an anode of the power supply 300 at one end of the electrode module 100, and the other module 100 is connected to a cathode of the power supply 300 at one end.

At this time, the power supply 300 is connected to the power connector 120a prepared on the current collector 120 inside the electrode module 100 using a soldering method.

According to the present exemplary embodiment, using the flexibility of the serially integrated electrode module 100, the connection of the power supply 300 to the deionization apparatus is achieved by only one power connection with respect to the respective anode and the cathode of the power supply 300. Thus, there is an advantage that the power application is easily carried out.

In this exemplary embodiment, as in the second exemplary embodiment, the top most and the bottom most electrode modules 100 that contact the end plates 500a and 500b have the electrode 140 arranged only at any one of above and below the current collector 120.

Thereafter, the electrode module is integrally bonded by thermocompression using the protective film 160 (see D region of FIG. 6A).

Although a few exemplary embodiments of the present invention have been shown and described, it would be appreciated by those skilled in the art that changes may be made in these exemplary embodiments without departing from the principles and spirit of the invention, the scope of which is defined in the claims and their equivalents.

What is claimed is:

1. An apparatus, comprising:
a plurality of electrode modules, each including
a current collector to receive power from an external power supply, said current collector having a periphery and an edge;
at least one electrode to receive power from the current collector, each of said at least one electrodes having a fluid contact area on an outwardly-facing surface, a periphery outside of the fluid contact area, an opposing surface facing the current collector, and an edge,
wherein the periphery of the current collector is substantially co-terminus with the periphery of the at least one electrode,
wherein the current collectors of the electrode modules are physically connected to each other in a co-planar relationship to form a single, elongated, planar current collector; and
a thermocompression bonding protective film contacting directly the respective peripheries and edges of the electrodes and of the current collectors,
wherein the single current collector includes a power connector at one projecting end to connect the single current collector to a power supply, and
wherein the film includes a first opening that corresponds to and exposes the single power connector, and second openings that correspond to and expose the fluid contact areas of the electrodes, respectively.

2. The apparatus according to claim 1, further comprising a connection part made of copper to connect neighboring current collectors to form the single current collector.

3. The apparatus according to claim 1, further comprising:
a conductive binder formed between the current collector and the at least one electrodes in each electrode module, so that the current collector adheres to the at least one electrodes in each electrode module.

4. The electrode module according to claim 1, wherein the single current collector is made of copper.

5. The apparatus as recited in claim 1, wherein at least one of the plurality of electrode modules comprises only one of the at least one electrode on one surface of the current collector, and a remainder of the plurality of electrode modules comprises two electrodes on opposite surfaces of the current collector.

6. The apparatus as recited in claim 5, wherein the power connector is on the at least one of the plurality of electrode modules.

7. A deionization apparatus comprising:
a pair of end plates;
a plurality of electrode modules formed between the end plates to perform deionization, wherein each electrode module has a plurality of current collectors, each adjacent at least one electrode,
wherein each current collector receives power from an external power supply and has a periphery, and each of the at least one electrodes has a periphery outside of a fluid contact area on an outwardly-facing surface of each electrode; and
a spacer formed between each of the electrode modules to be spaced a predetermined distance apart from one another,
wherein the current collectors of each of the plurality of electrode modules are physically connected together to form a respective, single, continuous, S-shaped current collector,
wherein each of the plurality of electrode modules is integrated by a thermocompression bonding protective film directly contacting the peripheries of the electrodes and the peripheries of the current collectors of the plurality of electrode modules,
wherein each of the single current collectors has a single power connector at one end thereof to connect the single current collector to the power supply, and
wherein the film includes first openings that correspond to and expose the power connector, and second openings that correspond to and expose the fluid contact areas of the at least one electrodes, respectively.

8. The apparatus according to claim 7, wherein each spacer is alternately laminated between two of the integrally bonded electrode modules such that the two electrode modules are spaced a predetermined distance apart from each other.

9. The apparatus according to claim 8, wherein any one of the two electrode modules is connected with an anode of the power supply at the end, and the other of the two electrode modules is connected with a cathode of the power supply at the end.

10. The electrode module according to claim 7, further comprising:
a conductive binder formed between each current collector and the at least one electrodes in each of the plurality of electrode modules, so that the current collector adheres to the at least one electrodes in each of the plurality of electrode modules.

11. The apparatus as recited in claim 7, further comprising forming at least one of the plurality of electrode modules with one electrode on one surface of the current collector, and a remainder of the plurality of electrode modules with two electrodes on opposite surfaces of the current collector.

* * * * *

UNITED STATES PATENT AND TRADEMARK OFFICE
CERTIFICATE OF CORRECTION

PATENT NO. : 8,440,064 B2  
APPLICATION NO. : 12/153818  
DATED : May 14, 2013  
INVENTOR(S) : Won Kyoung Lee et al.

Page 1 of 1

It is certified that error appears in the above-identified patent and that said Letters Patent is hereby corrected as shown below:

In the Claims:

Line 8, Column 9, In Claim 1, delete "electrodes" and insert -- electrode --, therefor.

Line 34, Column 9, In Claim 3, delete "electrodes" and insert -- electrode --, therefor.

Line 36, Column 9, In Claim 3, delete "electrodes" and insert -- electrode --, therefor.

Line 5, Column 10, In Claim 7, delete "collectors" and insert -- collector --, therefor.

Line 9, Column 10, In Claim 7, delete "electrodes" and insert -- electrode --, therefor.

Line 41, Column 10, In Claim 10, delete "electrodes" and insert -- electrode --, therefor.

Line 43, Column 10, In Claim 10, delete "electrodes" and insert -- electrode --, therefor.

Signed and Sealed this  
Fifteenth Day of October, 2013

Teresa Stanek Rea  
*Deputy Director of the United States Patent and Trademark Office*